(12) United States Patent
Nurmi et al.

(10) Patent No.: US 12,484,601 B2
(45) Date of Patent: Dec. 2, 2025

(54) OAT-BASED DISPERSIONS, FOOD PRODUCTS, AND PROCESSES FOR MAKING THE SAME

(71) Applicant: Oy Karl Fazer Ab, Helsinki (FI)

(72) Inventors: Niko Nurmi, Helsinki (FI); Katariina Rommi, Helsinki (FI); Jussi Loponen, Helsinki (FI)

(73) Assignee: Oy Karl Fazer Ab, Helsinki (FI)

( * ) Notice: Subject to any disclaimer, the term of this patent is extended or adjusted under 35 U.S.C. 154(b) by 0 days.

(21) Appl. No.: 18/684,215

(22) PCT Filed: Aug. 16, 2022

(86) PCT No.: PCT/FI2022/050531
§ 371 (c)(1),
(2) Date: Feb. 16, 2024

(87) PCT Pub. No.: WO2023/021240
PCT Pub. Date: Feb. 23, 2023

(65) Prior Publication Data
US 2025/0143355 A1  May 8, 2025

(30) Foreign Application Priority Data
Aug. 16, 2021 (FI) ........................ 20215860

(51) Int. Cl.
*A23G 1/48* (2006.01)
*A23B 9/02* (2006.01)
(Continued)

(52) U.S. Cl.
CPC ................ *A23L 7/107* (2016.08); *A23B 9/02* (2013.01); *A23C 11/10* (2013.01); *A23C 20/02* (2013.01); *A23L 5/30* (2016.08); *A23L 9/12* (2016.08)

(58) Field of Classification Search
CPC ... A23L 7/107; A23L 9/12; A23L 5/30; A23B 9/02; A23C 11/10; A23C 20/02
(Continued)

(56) References Cited

U.S. PATENT DOCUMENTS

2007/0128331 A1* 6/2007 Kvist .................. A61K 8/9794
426/602
2010/0272858 A1 10/2010 Kuusisto et al.
(Continued)

FOREIGN PATENT DOCUMENTS

CN 104430868 B 1/2018
EP 2996492 B1 7/2017
(Continued)

OTHER PUBLICATIONS

Immonen et al., Texturization of a Blend of Pea and Destarched Oat Protein Using High-Moisture Extrusion. (Year: 2021).*
(Continued)

*Primary Examiner* — Brent T O'Hern
(74) *Attorney, Agent, or Firm* — Laine IP Oy

(57) ABSTRACT

The present invention, relates to oat-based dispersions, to food products containing said oat-based dispersions, and to processes for forming the aforementioned products, wherein the processes include reducing the particle size of oat raw material, preferably by at least one of high-pressure homogenisation, microfluidization and wet milling.

3 Claims, 7 Drawing Sheets

(51) Int. Cl.
  *A23C 11/10* (2021.01)
  *A23C 20/02* (2021.01)
  *A23L 5/30* (2016.01)
  *A23L 7/104* (2016.01)
  *A23L 9/10* (2016.01)

(58) Field of Classification Search
  USPC .......................................................... 426/28
  See application file for complete search history.

(56) References Cited

U.S. PATENT DOCUMENTS

| | | | |
|---|---|---|---|
| 2011/0159145 | A1 | 6/2011 | Alho-Lehto et al. |
| 2012/0034341 | A1 | 2/2012 | Chen et al. |

FOREIGN PATENT DOCUMENTS

| | | |
|---|---|---|
| WO | WO0030457 A1 | 6/2000 |
| WO | WO2012126972 A1 | 9/2012 |
| WO | WO2020025856 A1 | 2/2020 |
| WO | WO2022144449 A1 | 7/2022 |

OTHER PUBLICATIONS

Fayaz et al: Impact of high pressure homogenization on physical properties, extraction yield and biopolymer structure of soybean okara. LWT Food Science and Technology, Oct. 2019, vol. 113, No. 108324.

Kivelä et al: Influence of homogenisation on the solution properties of oat ß-glucan. Food Hydrocolloids, 2011, vol. 24, pp. 611-618.

Munekata et al: Effect of Innovative Food Processing Technologies on the Physicochemical and Nutritional Properties and Quality of Non-Dairy Plant-Based Beverages. Foods, 2020, vol. 9, No. 288, 16 pages.

Valoppi et al: Valorization of Native Soluble and Insoluble Oat Side Streams for Stable Suspensions and Emulsions. Food and Bioprocess Technology, Feb. 11, 2021, vol. 14, No. 4, pp. 751-764.

* cited by examiner

OAT-BASED DISPERSIONS, FOOD PRODUCTS, AND PROCESSES FOR MAKING THE SAME

FIELD

The present invention relates to oat-based dispersions, to food products containing said oat-based dispersions, and to processes for forming the aforementioned products, wherein the processes include a step of reducing the particle size of oat raw material, preferably by using at least one of high-pressure homogenization, microfluidization, wet milling or any combinations thereof, such as wet milling combined with microfluidization.

BACKGROUND

Oat or oats (*Avena sativa*) is a species of cereal grain associated with various health benefits. The beneficial effects of oat are linked to reduction of blood cholesterol levels, reduction of blood glucose rise, and gut health. Compared to other cereals, oat contains more fat, protein, and soluble fibre, and is especially rich in β-glucan. The major storage proteins in oats are globulins, while prolamins constitute minor proteins of oat. Oats typically contains 55-70% starch on a dry matter basis.

Recently, consumption of oats has increased remarkably. In addition to above mentioned health benefits, this may be due to the fact that compared to other grains oats is well-tolerated, even by those having celiac disease. A variety of new oat based food products have also been developed, including oat based meat substitutes, oat based beverages and oat milk, the production of which has increased rapidly.

Oat milk or oat drink is produced by a process, wherein milled oat grains are soaked in water to extract their nutrients. Enzymes are typically used in the process to break down gelatinized oat starch into dextrins, which are then broken down into simpler sugars. The liquid fraction is separated from the solid by-product or residual fraction for example by decanting, filtration or centrifugation. The solid by-product or residual fraction from oat milk production, also called "oat okara", is a protein and fiber rich fraction, which currently is used mainly in the production of animal feeds or energy. In the manufacture of oat milk, approximately 40-200 g (wet weight) of the above mentioned solid residual fraction or by-product is produced per 1 L of oat milk. Typically, the residual fraction from oat milk production has a dry matter content of 15-50% and a very low content of starch compared to wholegrain oats. In a co-pending patent application (publication no. WO 2020/240095 A1) an oat fraction, which may be a residual fraction from oat milk production, is suggested for use in texturized food products.

Various attempts to manufacture stable oat based liquid products have been made. US20100272858 A1 relates to a drink comprising berry juice, water and oat based material, wherein the oat-based material contains from 0 to 40% by dry weight of starch. The stability of the drink is alleged to be improved by mixing the oat based material with berry juice to obtain a drink comprising 5-40% by weight of berry juice and 3-30% of oat based material, wherein the oat based material preferably is in the form of an oat suspension.

US20110159145 A1 relates to a process for the preparation of an oat suspension, wherein oat raw material is first milled so that at least 50%, preferably all the particles are larger than 200 µm, followed by treatment of the oat raw material with enzymes. The obtained oat suspension is included in various non-dairy edible compositions. WO 2021/126972 A1 discloses a process for providing a whole grain cereal based product, wherein the process comprises two grinding steps, hydrolysis, chemical and/or enzymatic modification steps and drying steps to obtain a final dry spent grain.

Recently, some new processing technologies for treatment of plant-based materials have been developed. Fayaz et al (2019) have studied impact of high-pressure homogenization on physical properties, extraction yield and biopolymer structure of soybean okara. Munekata et al (2020) discusses various food processing technologies, such as high-pressure homogenization at very high pressures (200-600 MPa), ultrasound and pulsed electric fields, in the manufacture of non-dairy plant-based beverages, such as almond milk and soybean-based milks. Valoppi et al (2021) have studied mechanical treatment of insoluble and soluble oat fractions in the manufacture of novel bio-based emulsifiers. WO 2020/025856 A1 discloses the use of ultrasonication in the preparation of high-protein liquid oat bases. However, ultrasonication does not produce a similar particle size as technologies described in the present invention.

One object of the present invention is to provide beneficial use for certain oat raw materials, in particular to an otherwise less utilized or even discarded residue of oat milk production, by physically treating said oat raw materials to obtain oat-based milk-free dispersions, which find use in various food and beverage products.

It would also be beneficial to provide oat based dispersions and oat based food products with improved mouthfeel and taste and/or improved stability compared to the oat based dispersions and food products of the prior art. It would also be an advantage to provide stable oat based dispersions which provide the final food and beverage products containing said dispersions with improved mouthfeel and colloidal stability compared to oat dispersions of the prior art.

SUMMARY OF THE INVENTION

The invention is defined by the features of the independent claims. Some specific embodiments are defined in the dependent claims.

The present invention is based on the concept of reducing the particle size of an oat raw material, which has a particle size D50 of 50-250 µm, a starch content of 5% or less, a protein content of at least 24%, preferably a fiber content of at least 5%, and preferably a beta-glucan content of 10% or less, on a dry matter basis, preferably by using at least one of high-pressure homogenization, microfluidization and wet milling, to obtain an oat-based, milk-free dispersion having a particle size D50 of 5-<50 µm, preferably 5-30 µm. The obtained oat-based, milk-free dispersion is an intermediate product, which has an improved mouthfeel and colloidal stability compared to a corresponding oat raw material not processed according to the method of the invention. The obtained oat-based, non-dairy dispersion finds use in various food and beverage products, where it provides the final food and beverage products with an improved mouthfeel and colloidal stability compared to products containing corresponding oat raw material not processed according to the present invention.

According to a first aspect of the present invention, there is thus provided a process for producing an oat-based, milk-free dispersion for food applications, the process comprising or consisting essentially of the steps of: a) providing oat raw material having a particle size D50 of 50-250 µm, a protein content of at least 24% and a starch content of 5% or less, based on dry matter; b) adjusting the dry matter content of the oat raw material to obtain an aqueous oat suspension having a dry matter content of 6-30%, preferably about 8-25; c) reducing the particle size of the oat raw material, preferably by using at least one of high-pressure homogenization, microfluidization and wet milling, more preferably high-pressure homogenization; d) optionally pasteurising and/or UHT treating the oat material before or subsequent to the step of reducing the particle size of the oat raw material; and e) recovering the oat-based dispersion having a particle size D50 of 5-<50 μm.

According to a second aspect of the present invention, there is provided an oat-based, milk-free dispersion, comprising or consisting essentially of an oat protein content of at least 24%, preferably at least 30%, more preferably at least 40%, based on dry matter;

an oat starch content of 5% or less, preferably 2% or less, based on dry matter;

an oat fiber content of at least 5%, preferably at least 7.5%, more preferably at least 10%, even more preferably at least 15%, based on dry matter;

a dry matter content of 6-30%, preferably about 8-25%, more preferably about 10-22%, typically about 12-20%; and having a particle size of D50 of 5-<50 μm, preferably 5-30 μm.

Embodiments of the invention comprise an oat-based, milk-free dispersion obtainable by the process of the invention. A further aspect of the invention is a food or beverage product comprising the oat-based, milk-free dispersion according to the invention.

A still further aspect is the use of the oat-based, milk-free dispersion of the invention within a food or beverage product or in the production of a food or beverage product.

Another aspect of the invention is the use of oat raw material having a particle size D50 of 50-250 μm, a protein content of at least 24%, a starch content of 5% or less, and preferably a beta-glucan content of 10% or less, based on dry matter, in the manufacture of oat-based dispersions having a particle size of 5-<50 μm, wherein the oat raw material preferably is oat okara.

Considerable advantages are obtained by the invention. First, the oat-based milk-free dispersion having a particle size of 5-<50 μm, typically 5-30 μm, is stable, has a good colloidal stability and improved mouthfeel and provides an improved mouthfeel and taste also to food and beverage products containing the dispersion. A considerably smaller amount of sedimentation takes place in the dispersion of the invention during storage compared to corresponding untreated oat raw material. Moreover, the small particle size provides an improved, smoother mouthfeel compared to an otherwise slightly sandy mouthfeel of non-treated oat dispersions.

Further, the process according to the invention is technically feasible and can proceed without energy-intensive drying steps. In addition, in a preferred embodiment the invention provides the use of a by-product from oat milk production in the preparation of the above-mentioned oat-based dispersions.

Further features and advantages of the present technology will appear from the following description of some embodiments.

BRIEF DESCRIPTION OF THE SEVERAL VIEWS OF THE DRAWINGS

FIG. 5: Solution with 12% dry matter content, before (left-hand side) and after (right-hand side) high-pressure homogenization at 900 bar.

EMBODIMENTS

Figure 1A:
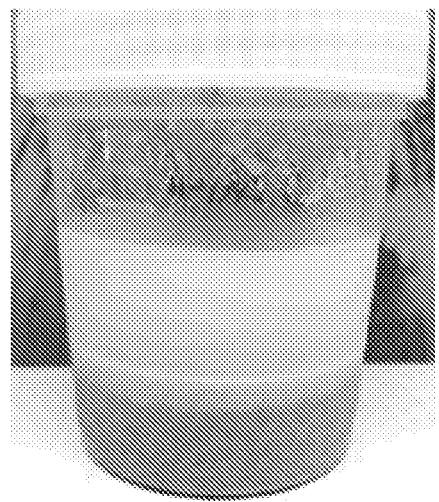
FIG. 1A illustrates an untreated sample (wet destarched oat diluted with water to 6% dry matter content) after storage of three days.

As stated above, it has been found that physical treatment of oat raw material having a starch content of 5% or less, preferably a fiber content of at least 5% and preferably a beta-glucan content of 10% or less, on a dry matter basis, to reduce the particle size of the oat raw material from a particle size D50 of 50-250 μm to a particle size D50 of 5-<50 μm, preferably 5-30 μm, preferably by using at least one of high-pressure homogenization, microfluidization and wet milling, provides an oat-based dispersion with improved properties for use in various food and beverage applications. In particular, the obtained oat-based dispersions are stable, have a good colloidal stability, improved mouthfeel and provide an improved mouthfeel and taste to food and beverage products containing said dispersions.

Within this context, a dispersion is considered "stable" if no phase separation is observed in said dispersion when evaluated visually after three days of storage at 6° C.

Oat Raw Material

In the present context, the term "oat raw material" comprises oat raw material having a starch content of 5% or less, preferably 4% or less, more preferably 3% or less, still more preferably 2% or less, based on dry matter. Further, the protein content of the oat raw material is at least 24%, preferably at least 30%, more preferably at least 40%, based on dry matter. In a preferred embodiment, the beta-glucan content of the oat raw material is 10% or less, preferably 5% or less, more preferably 2% or less, on a dry matter basis. Said oat raw material typically has a particle size D50 of 50-250 μm, preferably about 60-200 μm, more preferably 70-190 μm. Due to the low starch content, the term "destarched oats" may also be used for the raw material of the present invention.

Typically, the oat raw material for the purposes of the present invention is the by-product or residual fraction (oat okara) from the production of oat milk, oat beverages or liquid oat base, but any other oat fraction having the above-mentioned starch and protein content and particle size is also applicable. The oat raw material may thus be for example any oat suspension comprising oats and water, wherein the protein content is at least 24% and where starch content has been reduced to 5% or less, based on dry matter. One example of an oat suspension suitable for the present method is a hydrolysed oat suspension obtained for example in oat milk production before separation of the solid by-product or residual fraction.

Any sugars, oligosaccharides or other soluble components, such as soluble fibre, may be separated from the oat raw material before the step of reducing its particle size by at least one of high-pressure homogenization, microfluidization and wet milling.

As stated above, the oat raw material has a protein content of at least 24%, more preferably at least 30%, still more preferably at least 40%, based on dry matter. Typically, the oat raw material has a fiber content of at least 5%, preferably at least 10%, more preferably at least 15%, based on dry matter.

"Particle size D50" refers to the median volume-weighted particle diameter when measured by laser diffraction. In practice, 50% of the particles in volume are smaller than the D50 value. Similarly, D10 and D90 values can be used to describe the particle size distribution of a product, where 10% or 90% of the particles are smaller than D10 or D90, respectively.

As stated above, the oat raw material may comprise or consist essentially of a residue or by-product from the production of oat milk, oat drink, other oat beverages or liquid oat base. As used herein "liquid oat base" refers to an oat based intermediate product, which may be used in the preparation of oat drinks, other oat based non-dairy products or e.g. oat drink powder. Suitable preparation methods of a liquid oat base are disclosed for example in WO 2020/025856 A1.

A residue or by-product obtained from the production of oat milk (oat okara) typically has a dry matter content of 20-40% but the dry matter content may vary, for example between about 15-50%. The above dry matter ranges relate to a "wet form" of the by-product, which typically is obtained directly from oat milk production. If desired, a "dry form" having a dry matter content of e.g. 90-97% may be obtained for example by flash-drying or mill drying the wet form.

The residue or by-product of oat milk production has a very low content of starch, typically 5% or less, preferably 4% or 3% less, more preferably 2% or less, based on dry matter. However, it is rich in fiber and proteins, typically having a protein content of at least 20%, preferably at least 30%, more preferably at least 40%, based on dry matter. Its fiber content is typically at least 5%, preferably at least 7.5%, more preferably at least 10%, even more preferably at least 15%, based on dry matter. The beta-glucan content is rather low, typically 10% or less, preferably 5% or less, more preferably 2% or less, on a dry matter basis.

In embodiments of the invention, the oat raw material consists or consists essentially of a residue fraction or by-product from production of oat milk, oat drink, oat beverages, oat syrup or a liquid oat base, preferably from production of oat milk.

In a preferred embodiment, oat raw material is oat okara with a particle size D50 of 50-250 µm, preferably 60-200 µm, a protein content of at least 24%, preferably at least 30%, a starch content of 5% or less, preferably 2% or less, a beta-glucan content of 10% or less, preferably 5% or less, more preferably 2% or less, on a dry matter basis.

In preferred embodiments, in the particle size reduction step the oat raw material is provided in the form of an aqueous suspension, which has a dry matter content of 6-30%, preferably about 8-25%, more preferably about 10-22%, typically about 12-20%. If necessary, a suitable dry matter content for a particular physical treatment may be adjusted by adding water or a high-moisture or highly aqueous product, such as oat drink, and is selected according to the particular treatment used. For example, for high-pressure homogenisation a preferred dry matter content of the oat raw material feed is typically from at least about 9% to about 22%, such as 12-15%, wherein the oat raw material feed is preferably in the form of aqueous oat suspension.

Therefore, before reducing the particle size of the oat raw material, preferably by at least one of high-pressure homogenization, microfluidization and wet milling, the dry matter content of the oat raw material is adjusted to a desired level, if needed. Typically, this is achieved by mixing the oat raw material with water or a high-moisture (oat) product to form an aqueous suspension, which has a dry matter content of 6-30%, preferably about 8-25%, more preferably about 10-22%, still more preferably about 12-20%.

If needed, any soluble components may be separated from the oat raw material before reducing its particle size, preferably by at least one of high-pressure homogenization, microfluidization and wet milling. In an embodiment wherein the oat raw material comprises or is a residue fraction or by-product from oat milk production (oat okara), separation of the liquid fraction is typically carried out by decanting before a step of mixing the residue fraction with water to obtain an aqueous oat suspension with a desired dry matter content. However, other known separation methods such as filtration and centrifugation are also applicable and known to a person skilled in the art.

In an embodiment, the oat raw material has been subjected to at least one enzymatic treatment before the step of reducing its particle size. Preferably, the enzymatic treatment comprises at least treatment with amylases, in particular α-amylases.

In an embodiment wherein the oat raw material comprises or is a residue fraction from oat milk production, the enzymatic treatment is often included in the oat milk preparation process.

The oat raw material may also be combined with other raw materials before or subsequent to the step of reducing the particle size of the oat raw material, preferably with other raw materials selected from the group consisting of other oat fractions, such as oat bases, other protein sources, vegetable fats, hydrocolloid ingredients for food, vegetable starches, sweeteners, or the like.

High-Pressure Homogenization

The particle size of the oat raw material may be reduced for example by using at least one of high-pressure homogenization, microfluidization and wet milling. Typically, the particle size of the oat raw material is 50-250 µm (D50), preferably 60-200 µm, such as 70-190 µm. According to a preferred method of the invention, after applying at least one of high-pressure homogenization, microfluidization and wet milling the obtained oat based dispersion has a particle size D50 of 5-<50 µm, preferably 5-30 µm.

In a preferred embodiment of the invention, the method according to the invention comprises at least the step of high-pressure homogenizing the oat raw material.

In the present context, high-pressure homogenization comprises homogenization at a pressure of at least 450 bar (45 MPa), preferably at a pressure of at least 700 bar (70 MPa). Typically the applied pressures in the high-pressure homogenization according to the method of the present invention are within a range of 450-1900 bar (45-190 MPa), preferably within a range of about 700-1000 bar, such as about 900 bar.

Both single-stage and double-stage high-pressure homogenizers may be used. In a double-stage or two-stage homogenizer, the pressure at the first stage is at least 450 bar, such as 450-1900 bar, preferably at least 700 bar, while the pressure in the second stage is about 20-300 bar, typically about 50-200 bar.

The step of high-pressure homogenizing may comprise several passes of the raw material through a high-pressure homogeniser, such as 1-10 passes, preferably 1-3 passes, more preferably 1-2 passes. In preferred embodiments, one pass through the high-pressure homogenizer (either a single-stage or two-stage homogenizer) may be sufficient, when the operating pressure is at least 450 bar, typically about 700-1000 bar. It has been found that usual homogenization pressures, such as 100-250 bar, commonly used for example in dairy industry, are not sufficient for achieving the desired particle size and mouthfeel starting from the oat raw material used in the present invention. Nevertheless, it has also been found that by using oat okara as raw material and by adjusting its dry matter content to at least 17% and using pressures of at least 300 bar, a stable dispersion could be obtained.

The temperatures during high-pressure homogenization as well as during microfluidization may vary within a temperature range of +0-99° C., preferably 40-80° C., more preferably 50-70° C. Optional heating of the material before homogenization, such as pasteurization e.g. at about 80° C., does not have an effect on the homogenization result.

In some embodiments, the step of high-pressure homogenization may be followed by homogenization at a pressure of 20-300 bar, preferably at a pressure of 100-250 bar. In one embodiment, the process comprises the step of high-pressure homogenization, preferably with one pass through a high-pressure homogenizer, followed by homogenization at a lower pressure, typically at a pressure of 20-300 bar. Alternatively, homogenization at a pressure of 20-300 bar may precede the high-pressure homogenization.

The dry matter content of the oat raw material before high-pressure homogenization is adjusted to 6-30%, preferably about 8-25%, more preferably about 10-22%, typically about 12-20%, if not already within the mentioned ranges.

Typically, high-pressure homogenization does not essentially change the viscosity of the oat raw material feed, which has a dry matter content of 6-30%, preferably about 8-25%, more preferably about 10-22%, although the particle size decreases.

Microfluidization

In one embodiment of the invention, the method according to the invention comprises at least the step of microfluidizing the oat raw material. Microfluidization applies high dynamic pressure to a suspension, reducing its particle size. In microfluidization, a suspension is pumped through a fixed geometry interaction chamber where it is subjected to high shear rates and impact forces. Different chamber configurations are available and can be used in combinations.

Typically, applied microfluidization pressures in the method of the present invention are within a range of 100-2100 bar, preferably within a range of about 1000-1500 bar. The step of microfluidization may comprise several passes of the raw material through a microfluidization chamber, such as 1-10 passes, preferably 1-3 passes, more preferably 1-2 passes.

The step of microfluidization may also be combined with high-pressure homogenization, wet milling, or both.

Wet Milling

Generally, in wet milling or wet grinding process a product is wet-milled in the presence of solvents, such as water, and possibly different pH values, typically to disintegrate insoluble structures and reduce particle size. Wet milling can be used to separate grains into their main components, for example to produce protein concentrates, starch and residue fractions. In the present context, wet milling refers to treatment of the oat raw material by an ultra-fine friction grinder equipped with two ceramic grinding stones. Typically, applied gap in the method of the present invention are within a range of 0.05-5 micrometers, preferably in the range of 0.1-0.3 micrometres. The step of wet milling may comprise several passes of the raw material through the milling unit, such as 1-10 passes, preferably 1-3 passes, more preferably 1-2 passes.

In some embodiments, at least two of the above-disclosed processing technologies may be combined. In one preferred embodiment, the step of wet milling the oat raw material is followed by microfluidization or high-pressure homogenisation, preferably microfluidization. The combination of wet milling and microfluidization or high-pressure homogenization results in a smaller D50 particle size than wet milling alone, which can have advantages such as improved mouthfeel in end applications.

In some embodiments, in particular when the oat starting material is the dry form of the by-product from oat milk production, wet milling may be replaced with dry milling, followed by microfluidization or high-pressure homogenization.

Before or subsequent the step of reducing the particle size of the oat raw material, the oat raw material may be pasteurized and/or UHT treated. In one embodiment, after the step of reducing the particle size of the oat raw material the obtained oat based dispersion is pasteurized and/or UHT treated.

Pasteurizing comprises heat treatment of the oat raw material, typically at about 80° C. for a few minutes. UHT (ultra-high temperature processing, ultra-heat treatment) typically comprises heat treatment above 135° C. for a few seconds, such as 2 to 5 seconds.

In some embodiments, the obtained oat based dispersion may be subjected to enzymatic treatment and/or fermentation. Possible enzymes include protein modifying/hydrolyzing enzymes, such as transglutaminase, protein glutaminase or protease, or carbohydrate modifying/hydrolyzing enzymes such as cellulases, betaglucanases or xylanases, or combinations thereof. Fermentation can be achieved with lactic acid bacteria strains, yeast, or combinations thereof.

The obtained oat-based dispersion typically has a dry matter content of 6-30%, preferably about 8-25%, more preferably about 10-22%, typically about 12-20%. The dry matter content of the oat-based dispersion does not thus essentially differ from the dry matter content of the aqueous oat suspension before the step of particle size reduction by at least one of high-pressure homogenization, microfluidization and wet milling.

As stated above, the invention is also directed to an oat-based, non-dairy dispersion, comprising or consisting essentially of an oat protein content of at least 24%, preferably at least 30%, more preferably at least 40%, based on dry matter;

an oat starch content of 5% or less, preferably 2% or less, based on dry matter;

an oat fiber content of at least 5%, preferably at least 7.5%, more preferably at least 10%, even more preferably at least 15%, based on dry matter;

a beta-glucan content, which preferably is 10% or less, more preferably 5% or less, still more preferably 2% or less, based on dry matter;

a dry matter content of 6-30%, preferably about 8-25%, more preferably about 10-22%, typically about 12-20%; and having a particle size of D50 of 5-<50 µm, preferably 5-30 µm.

The oat-based dispersions according to the invention may be included in various food or beverage products, typically non-dairy food or beverage products. Examples of such non-dairy food or beverage products include but are not limited to drinks, spoonable snacks, yogurts or quark analogues, ice creams, spreads, puddings, plant-based creams, plant-based cream cheese or cheese analogues. Examples of other applicable food and beverage products include but are not limited to confectionary products such as chocolate or fudge, bakery products such as bread, cake or pastry, and any sweet or savoury plant-based fillings.

The invention also relates to the use of the oat-based dispersions in a non-dairy food or beverage product or in the production of a non-dairy food or beverage product, where the oat-based dispersion provides an improved mouthfeel to said products compared to corresponding oat raw material not processed according to the invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

EXPERIMENTAL

Unless otherwise stated, properties that have been experimentally measured or determined herein have been measured or determined at room temperature. Unless otherwise indicated, room temperature is 25° C. Unless otherwise stated, properties that have been experimentally measured or determined herein have been measured or determined at atmospheric pressure.

"Particle size D50" refers to the median volume-weighted particle diameter when measured by laser diffraction. In practice, 50% of the particles in volume are smaller than the D50 value. Similarly, D10 and D90 values can be used to describe the particle size distribution of a product, where 10% or 90% of the particles are smaller than D10 or D90, respectively.

As used herein, unless otherwise stated, the term "viscosity" stands for dynamic viscosity. In example 5, viscosity was measured with Anton Paar MCR 72 rheometer, using measuring system CC27 SN57094, at +5° C. and at shear rate 10 to 300 1/s. In Example 6, viscosities were measured with Thermo Scientific™ HAAKE™ Viscotester™ 2 Plus Rotational Viscometer. Measuring temperature was 10° C. and probe R3 was used in measurements.

Protein analysis refers to Kjeldahl total nitrogen analysis (nitrogen to protein conversion factor 6.25). Starch analysis refers to a spectrophotometric method, wherein starch is solubilized using DMSO and converted to glucose by amyloglucosinase enzyme. Glucose quantification is carried out using hexokinase method.

Fibre analysis refers to enzymatic-gravimetric analysis of dietary fibre using the method AOAC 991.43 Mod.

Dry matter analysis refers to gravimetric analysis of moisture using the method NMKL 23:1991, mod.

Dispersion stability was evaluated visually after three days of storage at +6° C. A sample was considered stable if no phase separation was observed at all.

Example 1: High-Pressure Homogenization of a Dilute Suspension Made from Oat Raw Material (Dry Form)

Figure 1B:
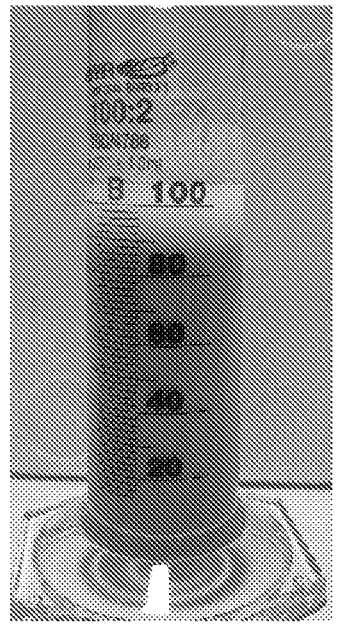
FIG. 1B illustrates colloidal stability of a destarched oat dispersion three days after high-pressure homogenization with a 2-stage high-pressure homogenizer at an operating pressure of 900/100 bar.

A destarched oat raw material comprising approx. 50% protein, 2% starch and 1.4% beta-glucan on dry matter basis, having a D50 particle size of 73 µm, was subjected to 2-stage high-pressure homogenizer. The raw material was diluted with water to 6% dry matter content and passed through the homogenizer. Operating pressure was 900/100 bar. Sample was stored at +6° C. for three days. Colloidal stability three days after high-pressure homogenization is shown FIG. 1B. Mouthfeel was very smooth and colloidal stability had improved compared to an untreated sample (destarched oat raw material diluted with water to 6% dry matter content) shown in FIG. 1A. The sample was not completely stable after three days due to relatively low dry matter content, indicating that high colloidal stability from the said oat raw material may be difficult to achieve even by high-pressure homogenization at low dry matter content.

Example 2: Comparison of Process Parameters During High-Pressure Homogenization of Oat Raw Material A destarched oat raw material comprising approx. 50% protein, 2% starch and 1.4% beta-glucan on dry matter basis, having a D50 particle size of 73 µm, was subjected to 2-stage high-pressure homogenizer. The raw material was diluted with water to 11-17% dry matter content and passed through the homogenizer 1-3 times. Operating pressures were between 450/50-900/100 bar. Experimental design was central composite face centred with three replicates in centre point. Samples particle size was analyzed by laser diffraction with a Mastersizer 3000 Hydro (Malvern Analytical, Worcestershire, UK). Dispersion stability was evaluated visually after three days of storage at +6° C. A sample was considered stable if no phase separation was observed at all. Mouthfeel was also evaluated by five trained panelists. Evaluation scale is shown in table 1. Results are summarized in Table 2.

TABLE 1

Mouthfeel evaluation scale for high-pressure homogenized oat dispersion.
Mouthfeel (sandiness)
Evaluation scale 1 = very sandy
2 = slightly sandy TABLE 1-continued Mouthfeel evaluation scale for high-pressure homogenized oat dispersion.
Mouthfeel (sandiness)
Evaluation scale 3 = no sandiness (good mouthfeel)
4 = smooth mouthfeel
5 = very smooth mouthfeel

TABLE 2

Experimental design and results from comparison of process parameters for high-pressure homogenization.

| | RECIPE & PARAMETERS | | | RESULTS | | | | |
|---|---|---|---|---|---|---|---|---|
| Experiment | Dry matter (%) | Homogensation bars (stage 1/stage2) | Number of passes | Mouthfeel (sandiness) | Stabile dispersion after 3 days (+6° C.) | D10 (µm) | D50 (µm) | D90 (µm) |
| 1 | 11 | 450/50 | 1 | slightly sandy | no | 5.1 | 32.5 | 113.0 |
| 2 | 17 | 450/50 | 1 | slightly sandy | yes | 5.3 | 33.7 | 124.0 |
| 3 | 11 | 900/100 | 1 | no sandiness | no | 4.4 | 25.5 | 82.1 |
| 4 | 17 | 900/100 | 1 | smooth mouthfeel | Yes | 4.6 | 25.6 | 84.2 |
| 5 | 11 | 450/50 | 3 | smooth mouthfeel | no | 4.3 | 23.7 | 68.6 |
| 6 | 17 | 450/50 | 3 | no sandiness | yes | 4.7 | 24.9 | 78.1 |
| 7 | 11 | 900/100 | 3 | very smooth mouthfeel | yes | 4 | 19.2 | 49.8 |
| 8 | 17 | 900/100 | 3 | very smooth mouthfeel | yes | 3.5 | 17.7 | 49.1 |
| 9 | 11 | 675/80 | 2 | no sandiness | no | 4.3 | 24.2 | 69.4 |
| 10 | 17 | 675/80 | 2 | no sandiness | yes | 4 | 22.1 | 70.5 |
| 11 | 14 | 450/50 | 2 | no sandiness | no | 4.9 | 27.9 | 90.5 |
| 12 | 14 | 900/100 | 2 | smooth mouthfeel | yes | 4 | 21.8 | 65.4 |
| 13 | 14 | 675/80 | 1 | no sandiness | no | 5 | 30.5 | 105 |
| 14 | 14 | 675/80 | 3 | smooth mouthfeel | yes | 4 | 21.2 | 58.6 |
| 15 | 14 | 675/80 | 2 | no sandiness | yes | 4.6 | 25 | 75.7 |
| 16 | 14 | 675/80 | 2 | no sandiness | yes | 4.5 | 24.1 | 67.7 |
| 17 | 14 | 675/80 | 2 | no sandiness | yes | 4.4 | 23.3 | 67.0 |

As can be seen from the results, a high-pressure homogenization at a pressure of approximately 700 bar is sufficient to provide a stable dispersion with a smooth mouthfeel, particularly if the number of passes is increased from 1. With a high-pressure homogenization at a pressure of 900 bar, a stable dispersion with a smooth mouthfeel and stability after 3 days' storage could be obtained with 1 pass through the 2-stage high-pressure homogenizer. Increasing the number of passes at said pressure further increased the smooth mouthfeel.

Example 3: Microfluidization of Oat Raw Material (Dry Form)

A destarched oat raw material (dry form) comprising approx. 50% protein, 2% starch and 1.4% beta-glucan on dry matter basis, having a D50 particle size of 73 µm, was subjected to microfluidization. The raw material was diluted with water to 12% dry matter content and passed through a microfluidizer 1-4 times. Operating pressure was 1000 bar during the first and second pass and 1500 bar during the third and fourth pass, respectively. Two chamber configurations were tested; 400+200 µm during the first and second pass and 400+100 µm during the third and fourth pass.

Figure 2:
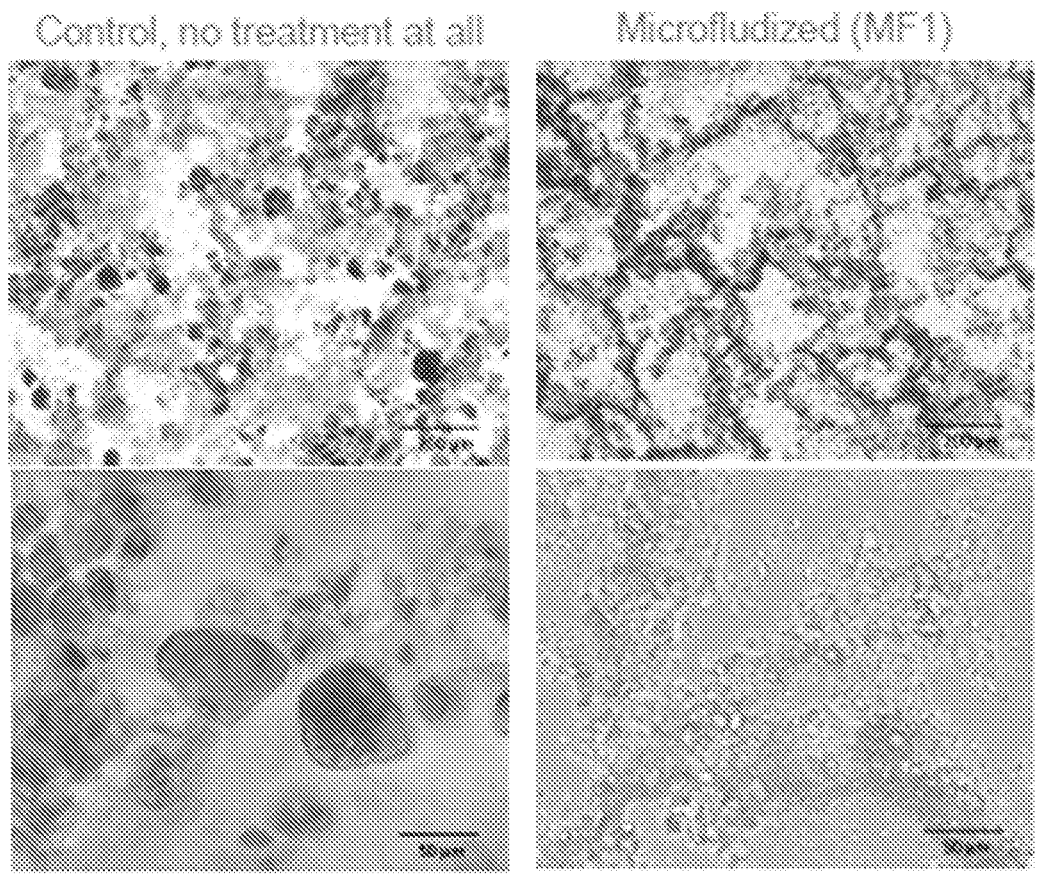
FIG. 2 shows microscopy images before and after microfluidization of oat raw material. The raw material was diluted with water to 12% dry matter content and passed through a microfluidizer at an operating pressure of 1000 bar.

Colloidal stability of the dispersion before and after treatments was determined after 1 h and 24 h by visual evaluation. Sample was considered stable if no phase separation was observed at all. The results are summarized in Table 3. Microscopy images before and after microfluidization (1 pass) are shown in FIG. 2.

Example 4: Wet Milling and Microfluidization of Oat Raw Material (Wet Form)

A destarched oat raw material (wet form) comprising approx. 50% protein, 2% starch and 1.4% beta-glucan on dry matter basis, having a D50 particle size of 188 µm, was subjected to wet milling using an ultra-fine friction grinder equipped with two grinding stones made of aluminium oxide and resins. The raw material was diluted with water to 10% dry matter content and passed through the mill twice at a rotation speed of 1500 rpm. Gap width between the grinding stones was 0.2-0.22 mm during the first pass and 0.25 mm during the second pass, respectively.

Figure 3:
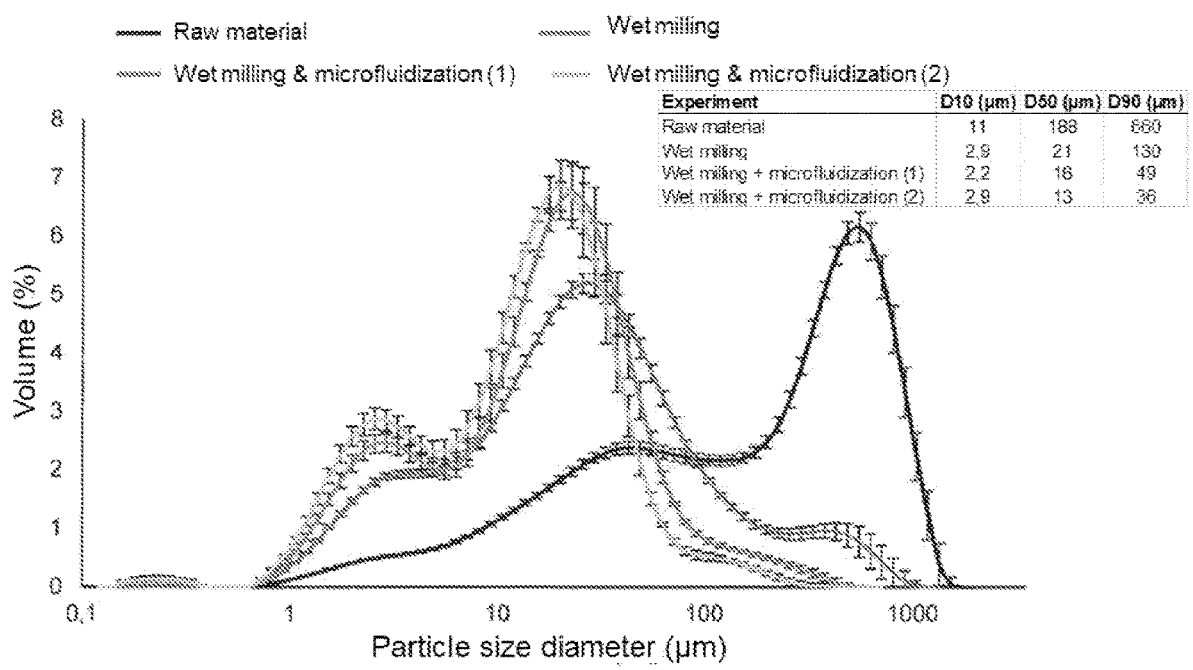
FIG. 3 shows particle size distribution of oat raw material (wet form) after wet milling and microfluidization.
Figure 4:
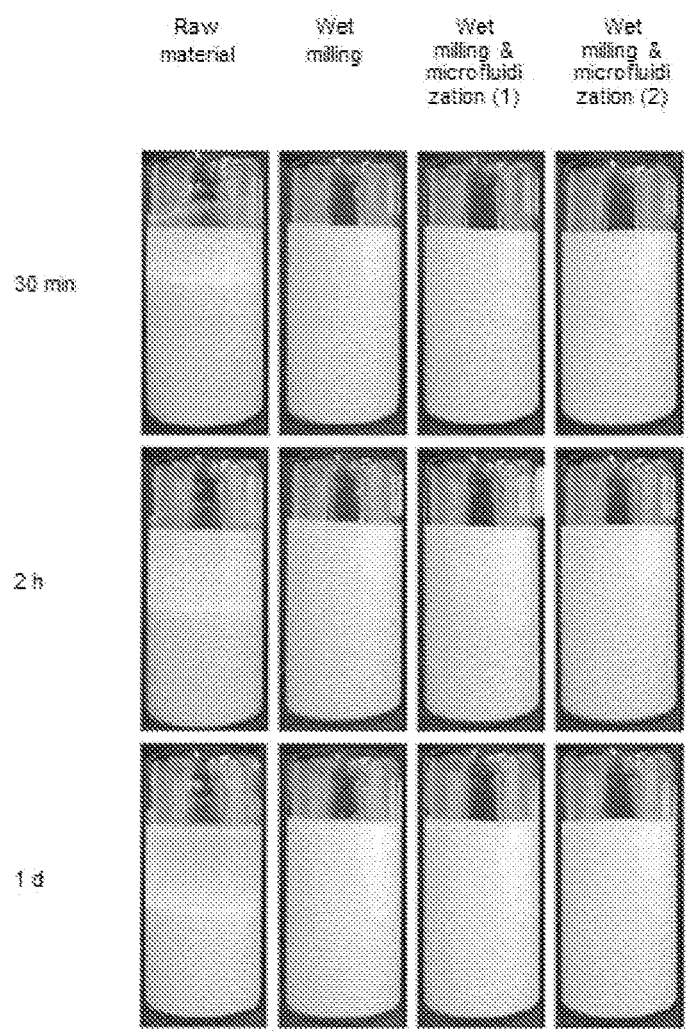
FIG. 4 illustrates colloidal stability of destarched oat dispersions after wet milling and microfluidization.

The wet-milled raw material was additionally subjected to microfluidization using two passes. Operating pressure was 1000 bar during the first pass and 1500 bar during the second pass, respectively, and chamber combinations were 400+200 µm. Particle size of the oat raw material was analyzed before and after the said treatments using laser diffraction. Colloidal stability of the oat raw material before and after treatments was determined after 0.5, 2 and 24 h by visual evaluation. The results are presented in FIGS. 3 and 4, showing that stable dispersions were obtained after wet milling or after a combination of wet milling and microfluidization. Volume-weighted D50, D10 and D90 particle sizes after wet milling and microfluidization experiments are summarized in Table 3, showing that wet milling and microfluidization significantly reduce particle size of the said oat raw material.

TABLE 3

D10, D50 and D90 particle sizes of oat raw materials (wet and dry form) before and after wet milling and/or microfluidization.

|  | Experiment | Dry mattter (%) | Chamber combination | microfluidization bars | D10 (µm) | D50 (µm) | D90 (µm) |
|---|---|---|---|---|---|---|---|
| Wet oat raw material | Raw material | 10 |  |  | 11 | 188 | 660 |
|  | Wet milling | 10 |  |  | 2.9 | 21 | 130 |
|  | Wet milling + microfluidization (1) | 10 | 400 + 200 µm | 1000 | 2.2 | 16 | 49 |
|  | Wet milling + microfluidization (2) | 10 | 400 + 100 µm | 1500 | 2.9 | 13 | 36 |
| Dried oat raw material (powder) | Raw material |  |  |  | 13.1 | 73.2 | 312 |
|  | Microfluidization | 12 | 400 + 200 µm | 1000 | 4.5 | 29.2 | 105 |

Example 5. High-Pressure Homogenization of Wet Oat Raw Material

Figure 5:
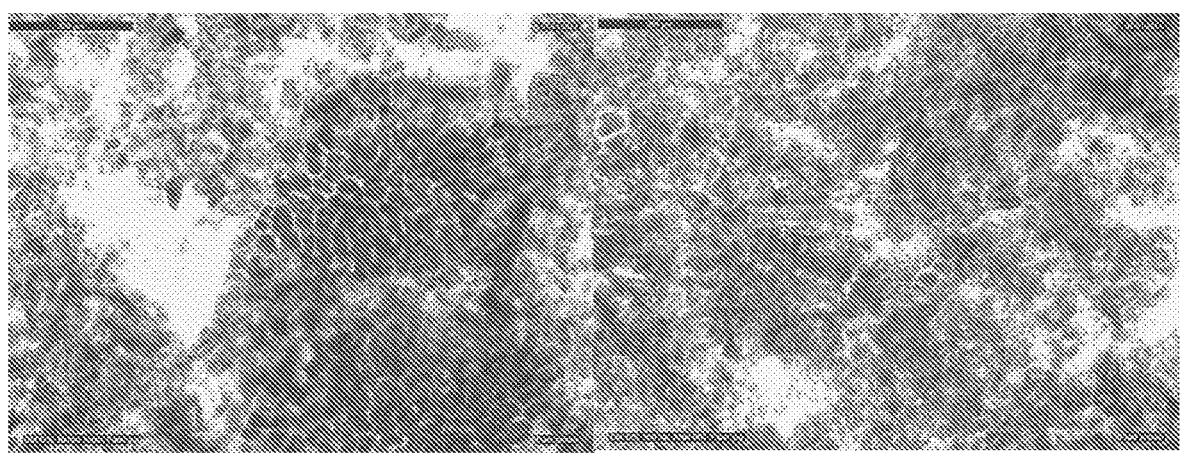
FIG. 5 shows microscopy images before and after high-pressure homogenization of oat raw material.

A destarched wet oat raw material comprising approx. 50% protein, 2% starch and 1.4% beta-glucan on dry matter basis, having a D50 particle size of 188 µm, was subjected to 1 and 2 stage high pressure homogenizer. The raw material was diluted with water to 12-20% dry matter content and passed through the homogenizer 1 time. Operating pressure was between 800-1000 bar. Sample particle sizes were analyzed by laser diffraction with a Mastersizer 3000 Hydro (Malvern Analytical, Worcestershire, UK). Dispersion stability was evaluated after three days of storage at +6° C. A sample was stable if no phase separation was observed at all. Microscopy images before and after high-pressure homogenization of a solution with a dry matter content of 12% are shown in FIG. 5.

TABLE 4

High-pressure homogenization of oat raw material having a dry matter content of 12-20%

| | RECIPE & PARAMETERS | | | RESULTS | | | |
|---|---|---|---|---|---|---|---|
| Experiment | Dry matter (%) | Homogensation bars (stage1/ stage2) | Number of passes | Stabile dispersion after 3 days (+6° C.) | D10 (µm) | D50 (µm) | D90 (µm) |
| 1 | 12 | 900 | 1 | yes | 4.13 | 28.6 | 131 |
| 2 | 16 | 800 | 1 | yes | 3.35 | 32.3 | 158 |
| 3 | 16 | 900 | 1 | yes | 3.54 | 30.5 | 139 |
| 4 | 16 | 900/100 | 1 | yes | 3.59 | 30.7 | 116 |

TABLE 4-continued

High-pressure homogenization of oat raw material
having a dry matter content of 12-20%

| | RECIPE & PARAMETERS | | | RESULTS | | | |
|---|---|---|---|---|---|---|---|
| Experiment | Dry matter (%) | Homogensation bars (stage1/ stage2) | Number of passes | Stabile dispersion after 3 days (+6° C.) | D10 (μm) | D50 (μm) | D90 (μm) |
| 5 | 16 | 1000 | 1 | yes | 3.91 | 29.9 | 134 |
| 6 | 20 | 900 | 1 | yes | 3.29 | 31.6 | 149 |

Figure 6:
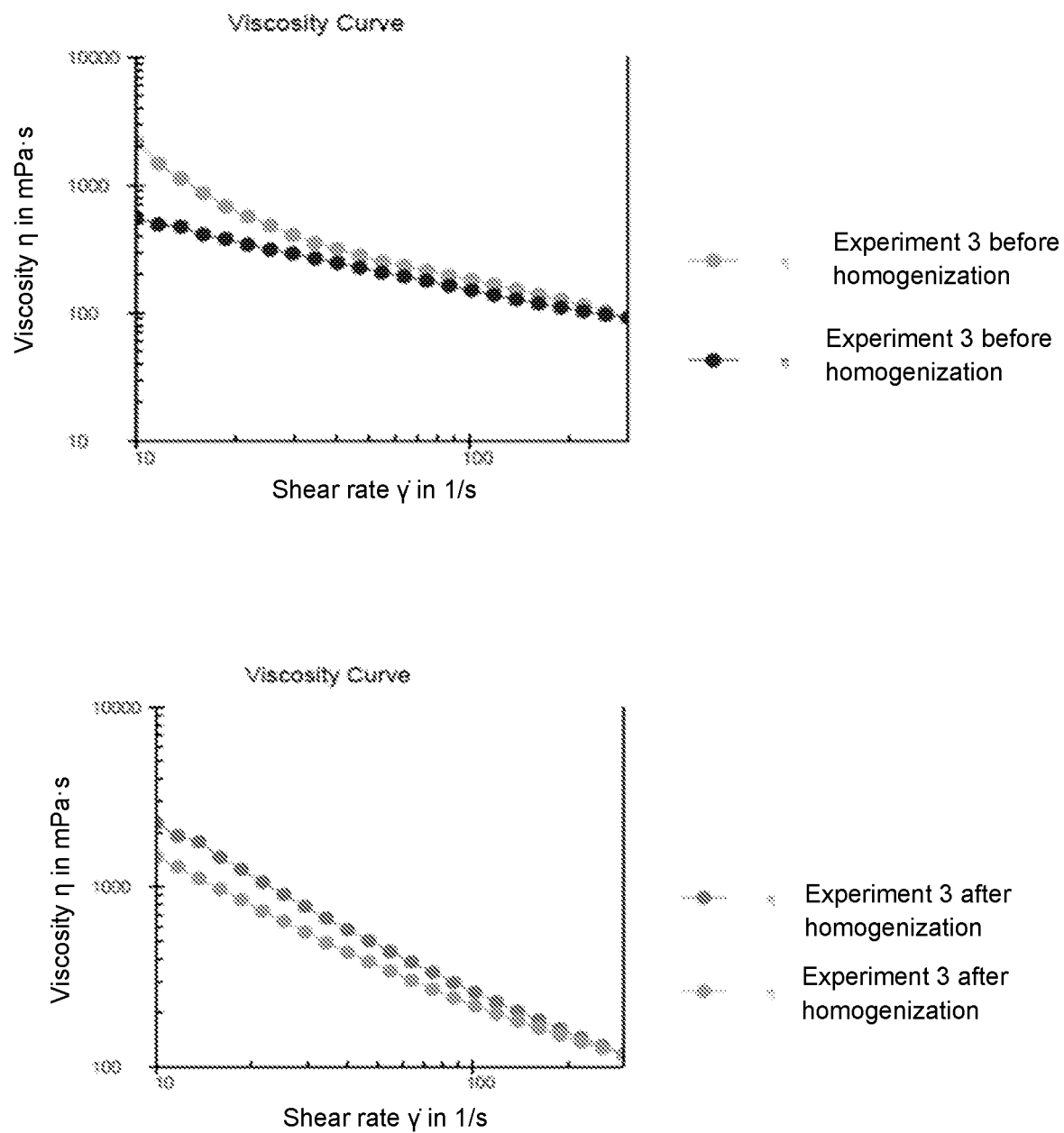
FIG. 6 illustrates viscosity measurement results before and after high-pressure homogenization of oat raw material.

For Experiment 3 (DM 16%, 900 bar), viscosity was measured with Anton Paar MCR 72 rheometer. Measuring system was CC27 SN57094. Viscosity was measured before and after homogenisation. Viscosity was measured at +5° C. at shear rate 10 to 300 1/s. The measurements, which are illustrated in FIG. 6, show that the product is shear thinning, and that the shear thinning properties changed slightly after high-pressure homogenization.

Example 6: Homogenization and High-Pressure Homogenization of Suspensions Made from Oat Raw Material (Dry Form) and its Effect on Viscosity A destarched oat raw material (dry form) comprising approx. 50% protein, 2% starch and 1.4% betaglucan on dry matter basis, having a D50 particle size of 73 μm, was diluted with water to 11% and 17% dry matter content. Solutions were homogenized (2-stage) and operation pressures were 300/50 bar (homogenisation) and 900/100 bar (high pressure homogenisation). Samples viscosities were measured with Thermo Scientific™ HAAKE™ Viscotester™ 2 Plus Rotational Viscometer. Measuring temperature was 10° C. and probe R3 were used in measurements. In Table 5 you can find sample details and results. Homogenisation by using 300/50 bar increased viscosity. Using higher homogenisation pressures did not affect sample viscosity although the particle size decreases.

TABLE 5

Viscosity of homogenized and high-pressure
homogenized oat raw materials

| Sample | Dry matter (%) | Homogenisation (bar) | Viscosity (dPas/10° C.) |
|---|---|---|---|
| 1 | 11 | — | 0.35 |
| 2 | 11 | 300/50 | 0.65 |
| 3 | 11 | 900/100 | 0.66 |
| 4 | 17 | — | 3.95 |
| 5 | 17 | 300/50 | 5.75 |
| 6 | 17 | 900/100 | 5.10 |

For the samples 5 and 6 after homogenization and high-pressure homogenization, heat treatment 20 min at 85° C. were done and dispersion stability was evaluated compared to unheated sample after three days storage at +6° C. There were no differences between heat treated sample and reference sample, indicating that they were heat-stable.

Figure 7:
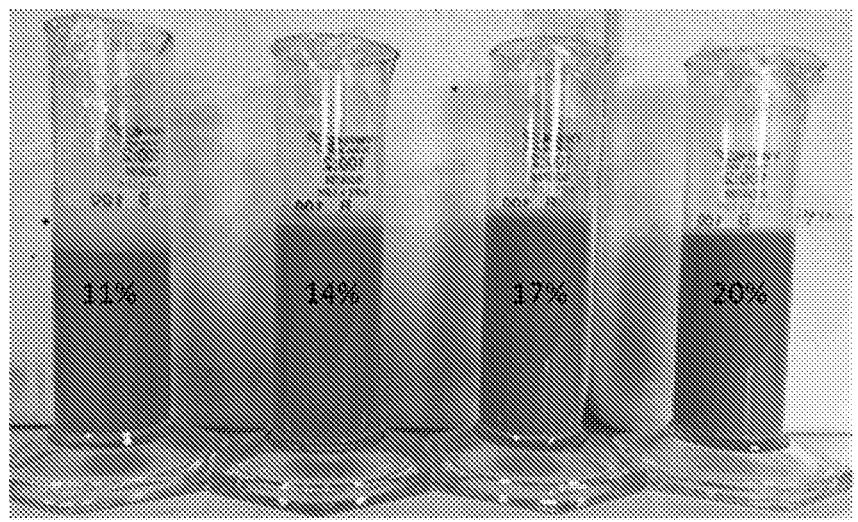
FIG. 7 shows colloidal stability of oat raw material after homogenization at 300/50 bar. Samples from left to right (11%, 14%, 17%, 20%).

Example 7. Homogenization of 11-20% Suspensions Made from Oat Raw Material (Dry Form), and its Effect on Colloidal Stability and Mouthfeel A destarched oat raw material comprising approx. 50% protein, 2% starch and 1.4% beta-glucan on dry matter basis, having a D50 particle size of 73 μm, was subjected to 2-stage homogenizer. The raw material was diluted with water to 11%, 14%, 17% and 20% dry matter contents and passed through the homogenizer. Operating pressure was 300/50 bar. Sample was stored at +6° C. for three days. Colloidal stability three days after high-pressure homogenization is shown in FIG. 7. Samples 11% and 14% were not fully stable unlike samples 17% and 20%, which were stable due to their high dry matter content. Mouthfeel was also evaluated by five trained panelists. Evaluation scale is shown in Table 6. Results are summarized in Table 7. All samples had a slightly sandy or very sandy mouthfeel, indicating that low operating pressure did not reduce particle size enough to yield desired mouthfeel.

TABLE 6

Mouthfeel evaluation scale for high-pressure homogenized oat dispersion
Mouthfeel (sandiness)
Evaluation scale 1 = very sandy
2 = slightly sandy
3 = no sandiness (good mouthfeel)
4 = smooth mouthfeel
5 = very smooth mouthfeel

TABLE 7

Sensory evaluation results

| Sample | Sensory evaluation |
|---|---|
| 11% | Slightly sandy (2) |
| 14% | Slightly sandy (2) |
| 17% | Very sandy (1) |
| 20% | Very sandy (1) |

Example 8. Pudding-Like Product

Figure 8:
FIG. 8 shows a pudding-like product containing an oat-based dispersion of the invention.

A destarched oat raw material (dry form) comprising approx. 50% protein, 2% starch and 1.4% beta-glucan on dry matter basis, having a D50 particle size of 73 μm, was used for making pudding like product. Water was heated up to 60° C. and pre-mixed dry ingredients were added to water (water 73%, destarched oat raw material 15%, cocoa powder 2%, sugar 6%, potato starch 1%). The mass was mixed and melted coconut oil (3%) was added. The mass was heated to 70° C. and high-pressure homogenized at 900/100 bar. After homogenisation the mass was cooled to +6° C. Pudding-like product is shown in FIG. 8.

Example 9. Cheese-Like Product

A destarched oat raw material (dry form) comprising approx. 50% protein, 2% starch and 1.4% beta-glucan on dry matter basis, having a D50 particle size of 73 µm, was used for making a cheese-like product. The raw material was diluted with water to 20% dry matter content and passed through a high-pressure homogenizer. Operating pressure was 900/100 bar. Melted coconut oil (30%) was mixed with high-pressure homogenized oat raw material (47%) in a STEPHAN Universal Machine UM 12. Starch mixture (23%) was added and mixed 5 min with full speed. The mass was heated to 90° C. by using double jacket and cooled down to 4-10° C.

Example 10 (Comparative). Ultrasonication of Oat Raw Material (Dry Form)

A destarched oat raw material (dry form) comprising approx. 50% protein, 2% starch and 1.4% beta-glucan on dry matter basis, having a D50 particle size of 73 µm, was subjected to ultrasonication. The raw material was diluted with water to 12% dry matter content. The dispersion was ultrasonicated for 0.5 or 2 min while cooling the sample on an iced water bath. Frequency was 20 kHz and amplitude 95%. Sample was stored at +6° C. for 24 hours.

Figure 9:
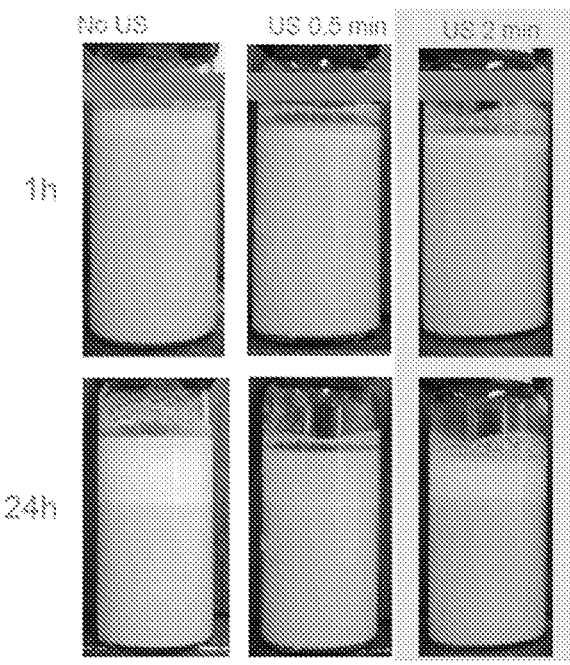
FIG. 9 illustrates colloidal stability of destarched oat dispersion 1 and 24 h after ultrasonication for 0.5 or 2 min at a frequency of 20 kHz and amplitude of 95%.

Colloidal stability 1 and 24 hours after ultrasonication is shown in FIG. 9. Ultrasonication improved colloidal stability to some extent, but it did not yield a fully stable dispersion.

Figure 10:
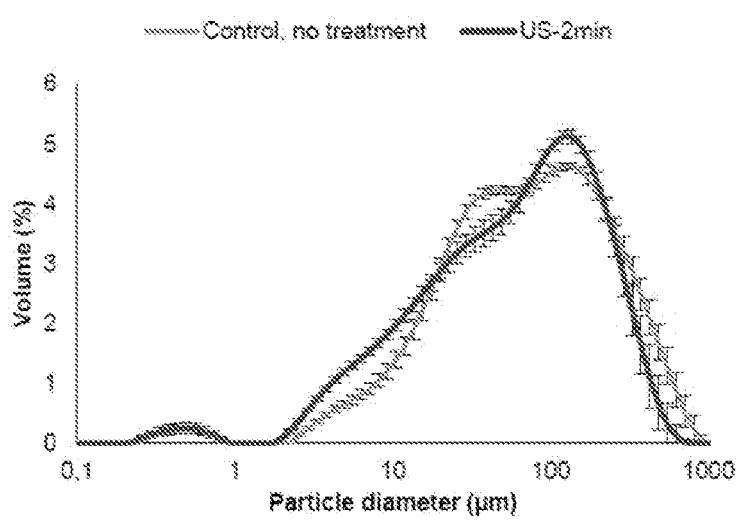
FIG. 10 shows particle size distribution before and after ultrasonication of destarched oat dispersion for 0.5 or 2 min at a frequency of 20 kHz and amplitude of 95%.

Particle size distribution before and after ultrasonication is shown in FIG. 10 and Table 8. Ultrasonication slightly reduced the particle size, but not as effectively as high-pressure homogenization (Example 2, Table 2, above). A particle size could not be reached which had been associated with smooth mouthfeel (preferably D50<25.6 µm) or no sandiness (preferably D50<30.5 µm) in the high-pressure homogenization experiment.

TABLE 8

| Treatment | D10 (µm) | D50 (µm) | D90 (µm) |
| --- | --- | --- | --- |
| Control, no treatment | 13.1 ± 1.1 | 73.2 ± 5.5 | 312.0 ± 27.8 |
| US 2 min | 8.1 ± 0.3 | 65.5 ± 5.7 | 244.0 ± 25.0 |

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in food industry. The milk-free, oat-based dispersion and the process for its preparation find use in the manufacture of various food and beverage products, such as non-dairy products selected from the group consisting of a drink, spoonable snack, yogurt and quark analogues, ice cream, spread, pudding, plant-based cream, plant-based cream cheese and cheese analogue. Examples of other applicable food and beverage products include but are not limited to confectionary products such as chocolate or fudge, bakery products such as bread, cake or pastry, and sweet or savoury plant-based fillings.

Acronyms List

DM dry matter
UHT ultra-high temperature processing

CITATION LIST

Patent Literature

US20100272858 A1
US20110159145 A1
WO 2020/025856 A1
WO 2020/240095 A1

Non Patent Literature

Fayaz, G. et al, "Impact of high pressure homogenization on physical properties, extraction yield and biopolymer structure of soybean okara". LWT Food Science and Technology 113 (2019) 108324.

Munekata, P. E. S. et al, "Effect of Innovative Food Processing Technologies on the Physicochemical and Nutritional Properties and Quality of Non-Dairy Plant-Based Beverages". Foods 2020, 9, 288.

Valoppi, F. et al, "Valorization of Native Soluble and Insoluble Oat Side Streams for Stable Suspensions and Emulsions". Food and Bioprocess Technology (2021) 14:751-764.

The invention claimed is:

1. An oat-based, non-dairy dispersion comprising or consisting essentially of
    an oat protein content of at least 24%, based on dry matter;
    an oat starch content of 5% or less, based on dry matter;
    an oat fiber content of at least 5%, based on dry matter;
    a beta-glucan content of 10% or less, based on dry matter;
    a dry matter content of 6-30%; and
    having a D50 particle size of 5-50 µm.

2. The oat-based, non-dairy dispersion according to claim 1, wherein the beta-glucan content is 5% or less, based on dry matter.

3. The oat-based, non-dairy dispersion according to claim 1, wherein the dispersion is incorporated in a non-dairy product selected from the group consisting of a drink, spoonable snack, yogurt or quark analogue, ice cream, spread, pudding, plant-based cream, plant-based cream cheese or cheese analogue, a confectionary product, chocolate, fudge, bread, cake, pastry, and a sweet or savoury plant-based filling.

* * * * *